(12) United States Patent
Tan

(10) Patent No.: US 11,767,075 B2
(45) Date of Patent: Sep. 26, 2023

(54) SCOOTER

(71) Applicant: VEORIDE INC., Chicago, IL (US)

(72) Inventor: Yanke Tan, Chicago, IL (US)

(73) Assignee: VEORIDE INC., Chicago, IL (US)

( * ) Notice: Subject to any disclaimer, the term of this patent is extended or adjusted under 35 U.S.C. 154(b) by 307 days.

(21) Appl. No.: 17/443,867

(22) Filed: Jul. 28, 2021

(65) Prior Publication Data

US 2022/0340227 A1  Oct. 27, 2022

(30) Foreign Application Priority Data

Apr. 27, 2021  (CN) .......................... 202120890981.7

(51) Int. Cl.
*B62K 3/00* (2006.01)
*B62K 19/32* (2006.01)
*B62M 3/08* (2006.01)
*B62J 15/00* (2006.01)
*B62J 6/04* (2020.01)

(52) U.S. Cl.
CPC ................. *B62K 3/002* (2013.01); *B62J 6/04* (2013.01); *B62J 15/00* (2013.01); *B62K 19/32* (2013.01); *B62M 3/08* (2013.01)

(58) Field of Classification Search
CPC .................................................... B62K 3/002
See application file for complete search history.

(56) References Cited

U.S. PATENT DOCUMENTS

| | | | |
|---|---|---|---|
| 6,619,679 B2 * | 9/2003 | Lan ........................ | B62K 3/002 |
| | | | 180/181 |
| 7,044,488 B1 * | 5/2006 | Hamend ................ | B62K 3/002 |
| | | | 280/62 |
| 7,712,937 B2 * | 5/2010 | Grossman .............. | B62K 3/002 |
| | | | 362/249.02 |
| 8,256,779 B1 * | 9/2012 | Johnson ............... | A63C 17/015 |
| | | | 280/87.01 |
| 8,801,010 B2 * | 8/2014 | Deb .......................... | B62J 7/00 |
| | | | 280/87.041 |
| 8,944,452 B1 * | 2/2015 | Scolari ..................... | B62M 5/00 |
| | | | 280/258 |
| 9,475,543 B1 * | 10/2016 | Chou ....................... | B62M 1/26 |
| 9,555,316 B2 * | 1/2017 | Imbrie ................. | A63C 17/012 |
| 9,943,749 B2 * | 4/2018 | Cerboneschi .......... | A63C 17/26 |
| 10,407,117 B2 * | 9/2019 | Allais .................... | B62K 3/002 |
| 10,583,887 B2 * | 3/2020 | Ko .......................... | B62K 21/22 |
| 10,766,559 B1 * | 9/2020 | Nelson ................... | B62K 3/002 |
| 10,822,046 B2 * | 11/2020 | Huang ................ | B62K 15/006 |

(Continued)

*Primary Examiner* — Erez Gurari
(74) *Attorney, Agent, or Firm* — ASCENDA LAW GROUP, PC

(57) ABSTRACT

The disclosure provides a scooter and relates to the technical field of vehicles for replacing walking. The scooter includes a head, a front wheel bracket, a front wheel, a body, a rear wheel bracket and a rear wheel. The body includes a main plate and a bottom plate, and a movable frame is arranged at the bottom plate. The dual-use of the movable frame can be realized by hinging the movable frame to the main plate, so that the movable frame can be used not only for the support when parking, but also for the protection of the body during driving. The tail lamp plate integrally connected to the bottom plate can better ensure the driving safety by setting the light-emitting surface inclined. Moreover, the guard can be easily removed for cleaning.

8 Claims, 5 Drawing Sheets

(56) References Cited

U.S. PATENT DOCUMENTS

| | | | | |
|---|---|---|---|---|
| 11,364,967 B1* | 6/2022 | Owen | ............... | B62K 3/002 |
| 11,370,319 B2* | 6/2022 | Treadway | ............... | B60L 53/80 |
| 11,383,777 B2* | 7/2022 | Khanna | ............... | B62H 1/02 |
| 11,485,443 B2* | 11/2022 | Mendez | ............... | B62J 9/21 |
| 11,597,463 B2* | 3/2023 | Ulmen | ............... | B62M 6/45 |
| 11,649,007 B1* | 5/2023 | Zhang | ............... | B62K 3/002 |
| | | | | 362/473 |
| 2002/0140193 A1* | 10/2002 | Chai | ............... | B62K 15/006 |
| | | | | 280/87.041 |
| 2003/0214108 A1* | 11/2003 | Lan | ............... | B62K 15/006 |
| | | | | 280/87.05 |
| 2005/0057012 A1* | 3/2005 | Boyle | ............... | B62K 3/002 |
| | | | | 280/87.05 |
| 2009/0115160 A1* | 5/2009 | Chiu | ............... | B62K 15/008 |
| | | | | 280/278 |
| 2015/0166141 A1* | 6/2015 | Lovley, II | ............... | B62K 11/02 |
| | | | | 280/87.041 |

* cited by examiner

SCOOTER

RELATED APPLICATIONS

This application claims priority to and incorporates by reference CN 202120890981.7, filed 27 Apr. 2021.

TECHNICAL FIELD

The disclosure relates to the technical field of vehicles for replacing walking, in particular to a scooter.

BACKGROUND

Scooters are widely used in short distance travel because of their moderate speed and simple operation. In existing scooters, a support frame acting as a parking support can only play a single parking role, but cannot play other roles to improve the performance of the scooter. The guard for blocking mud from the front wheel is fixed in most cases. When the mud accumulates to a certain amount, it is not convenient to clean the fixed guard.

SUMMARY

In order to overcome the disadvantages of the prior art, the disclosure provides a scooter.

The technical solution adopted by the disclosure for solving the technical problem is as follows. A scooter is provided, including: a head, a front wheel bracket, a front wheel, a body, a rear wheel bracket and a rear wheel. The body includes a main plate and a bottom plate which are integrally connected, the head is connected with the front wheel bracket, the front wheel bracket is connected with the front wheel, the head is fixedly connected with the main plate, the head is fixedly connected with the bottom plate, the bottom plate is fixedly connected with the rear wheel bracket, and the rear wheel bracket is connected with the rear wheel. A movable frame is arranged at the bottom plate, and the movable frame is hinged to the bottom plate. The movable frame is provided with a push plate for driving the movable frame to rotate.

In the above structure, the push plate is provided with a protrusion.

In the above structure, a pedal is arranged at the bottom plate, the pedal is arranged in a same horizontal plane as the push plate in a horizontal state, and has a shape matching a shape of the push plate in the horizontal state.

In the above structure, a tail lamp plate is arranged at an end of the bottom plate, and the tail lamp plate is integrally connected with the bottom plate.

In the above structure, the tail lamp plate has an inclined light-emitting surface.

In the above structure, an LED light board is arranged at the bottom plate.

In the above structure, a fixing frame and a guard are arranged at the front wheel bracket, the guard is provided with an embedding column, the fixing frame has an embeddable hole corresponding to the embedding column, the embedding column is configured to be embedded in the embeddable hole, the guard is configured to shield external sundries.

In the above structure, a front mudguard is further arranged at the front wheel bracket, and a rear mudguard is arranged at the rear wheel bracket.

The disclosure has the following beneficial effects. The dual-use of the movable frame can be realized by hinging the movable frame to the main plate, so that the movable frame can be used not only for the support when parking, but also for the protection of the body during driving. The tail lamp plate integrally connected to the bottom plate can better ensure the driving safety by setting the light-emitting surface obliquely. Moreover, the guard can be easily removed for cleaning.

DETAILED DESCRIPTION OF THE EMBODIMENTS

The disclosure will be described further with reference to the accompanying drawings and embodiments.

The following describes the concept, specific structure and technical effects of the disclosure in a clear and complete manner with reference to the embodiments and accompanying drawings to fully understand the purpose, features and effects of the disclosure. Obviously, the described embodiments are only some but not all of the embodiments of the disclosure. Based on the embodiments of the disclosure, other embodiments obtained by those skilled in the art without creative efforts all fall within the protection scope of the disclosure. In addition, all of the coupling/connection relationships referred to in this patent application do not only refer to the direct connection of components, but also to the formation of a better coupling structure by adding or reducing connection accessories according to the specific implementation. The technical features in the disclosure can be interactively combined on the premise of no contradiction and conflict.

Figure 1:
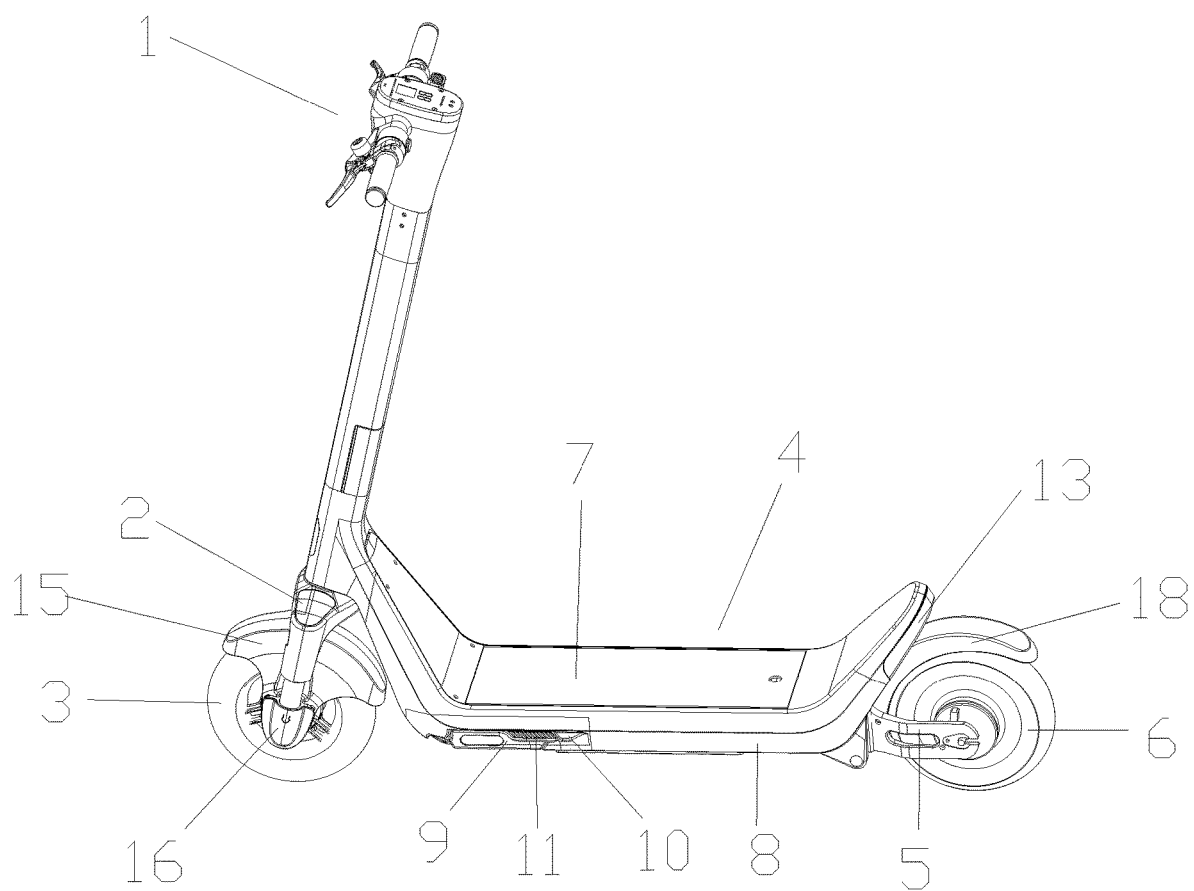
FIG. 1 is a schematic view showing an integral structure of a scooter according to the disclosure.
Figure 2:
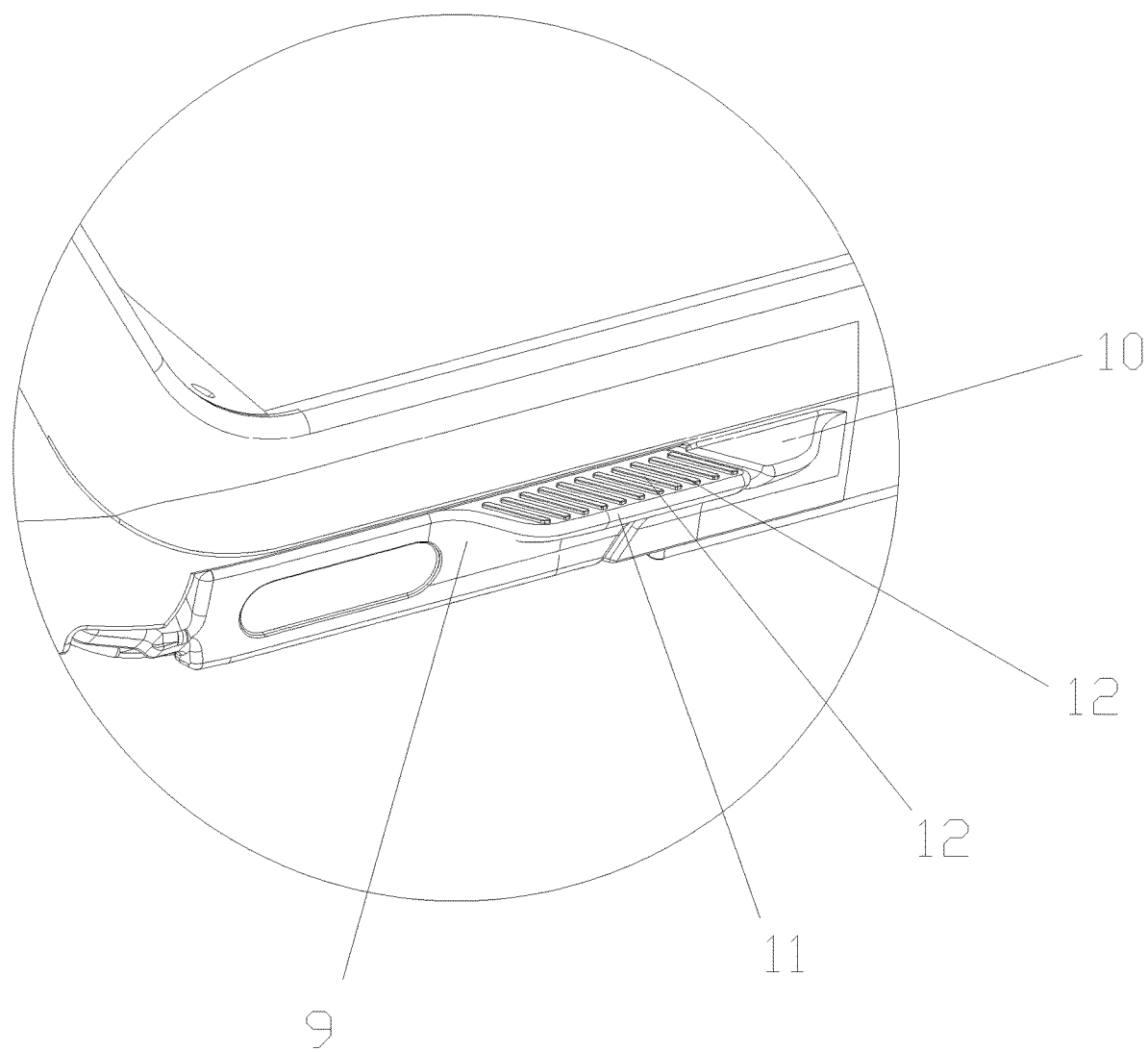
FIG. 2 is an enlarged view of a movable frame and a pedal in FIG. 1.
Figure 3:
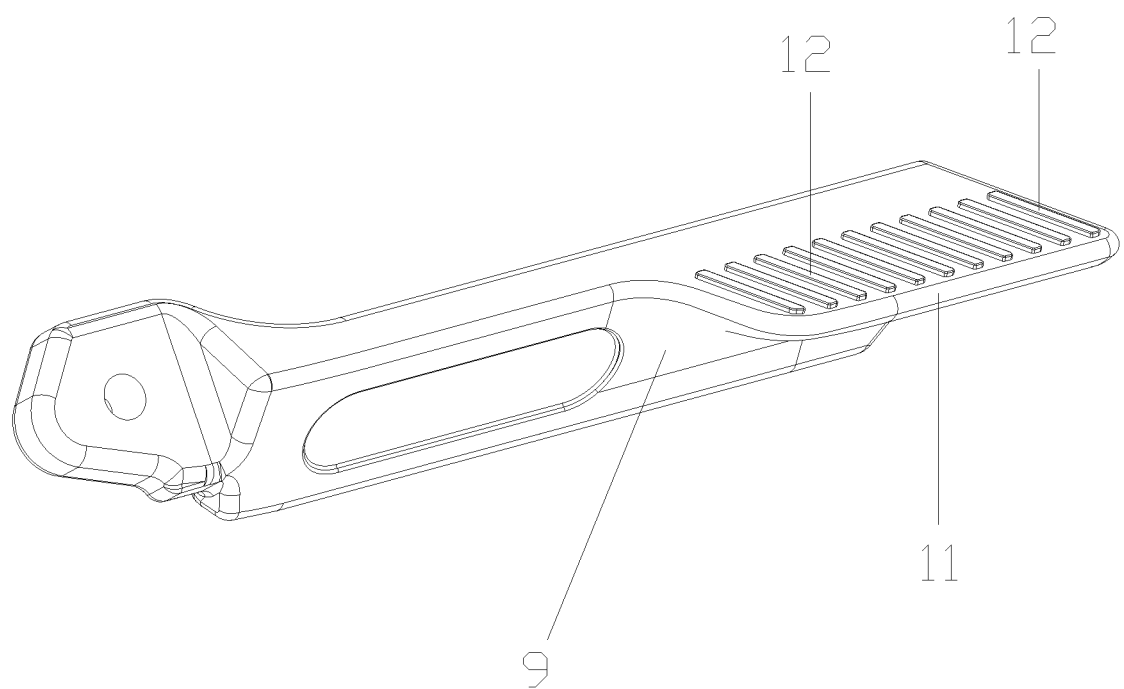
FIG. 3 is a schematic structural view of the movable frame in FIG. 1.

As shown in FIG. 1, FIG. 2 and FIG. 3, the disclosure shows a scooter, which includes a head 1, a front wheel bracket 2, a front wheel 3, a body 4, a rear wheel bracket 5 and a rear wheel 6. The body 4 includes a main plate 7 and a bottom plate 8 which are integrally connected. The head 1 is connected with the front wheel bracket 2, the front wheel bracket 2 is connected with the front wheel 3, the head 1 is fixedly connected with the main plate 7, the head 1 is fixedly connected with the bottom plate 8, the bottom plate 8 is fixedly connected with the rear wheel bracket 5, and the rear wheel bracket 5 is connected with the rear wheel 6. A movable frame 9 and a pedal 10 are arranged at the bottom plate 8, and the movable frame 9 is hinged to the bottom plate 8, so that the movable frame 9 is rotatable relative to the bottom plate 8. The movable frame 9 is provided with a push plate 11. When the push plate 11 is moved downward, the push plate 11 drives the movable frame 9 to rotate downward. At this time, the movable frame 9 in the downward state can be used as a parking side support when the scooter is parking, which ensures the stable parking of the scooter. Before the parking scooter is driven, the push plate 11 is moved upward to drive the movable frame 9 back to a horizontal state, so that the scooter can be driven normally.

The push plate 11 in the horizontal state is in the same horizontal plane as the pedal 10 and has a shape matching the shape of the pedal 10 so that the push plate 11 and the pedal 10 form an integrated shape, which makes the scooter have an aesthetic and harmonious appearance. Moreover, the push plate 11 can be used as the auxiliary of the pedal 10 to enable the pedal 10 to function better, and the push plate 11 and the pedal 10 protruding from the body 4 can protect the body 4 from being scratched during driving. Furthermore, the push plate 11 is provided with a plurality of protrusions 12, which can increase the friction force on the surface of the push plate 11, making it more convenient and labor-saving to move the push plate 11.

Figure 4:
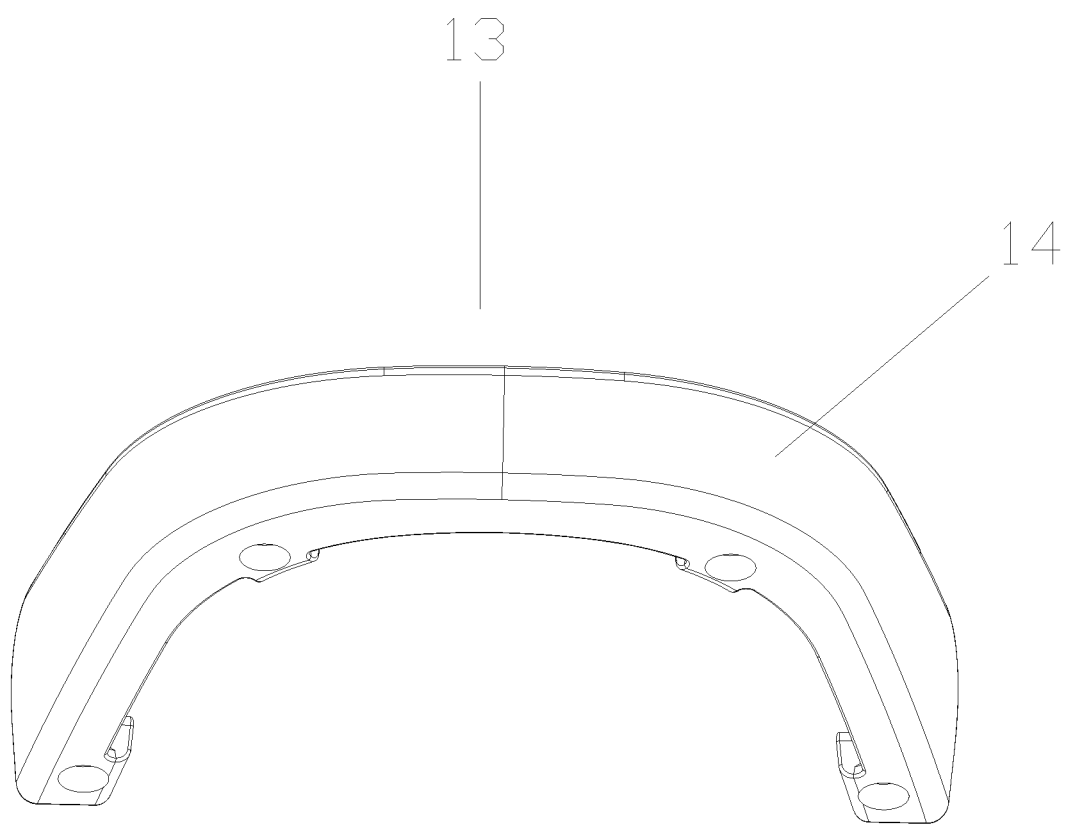
FIG. 4 is a schematic structural view of a tail lamp plate in FIG. 1.

Referring to FIG. 1 and FIG. 4, in this embodiment, a tail lamp plate 13 is arranged at an end of the bottom plate 8, which can emit light to remind vehicles or pedestrians behind the scooter, thereby ensuring driving safety. The tail lamp plate 13 is integrally connected with the bottom plate 8 to make the scooter have an aesthetic and harmonious appearance. A light-emitting surface 14 on an outer side of the tail lamp plate 13 is inclined. When the tail lamp plate 13 emits light, the light emitted from the light-emitting surface 14 inclines upward or downward for avoiding discomfort of pedestrians or vehicles in the rear caused by directly lighting, which is conducive to the pedestrians or vehicles in the rear to see more clearly, thereby better ensuring the driving safety.

In this embodiment, an LED light board (not shown in the figure) is arranged at the bottom plate 8. When the scooter falls down during parking, the LED light board will give a prompt to remind the owner.

Figure 5:
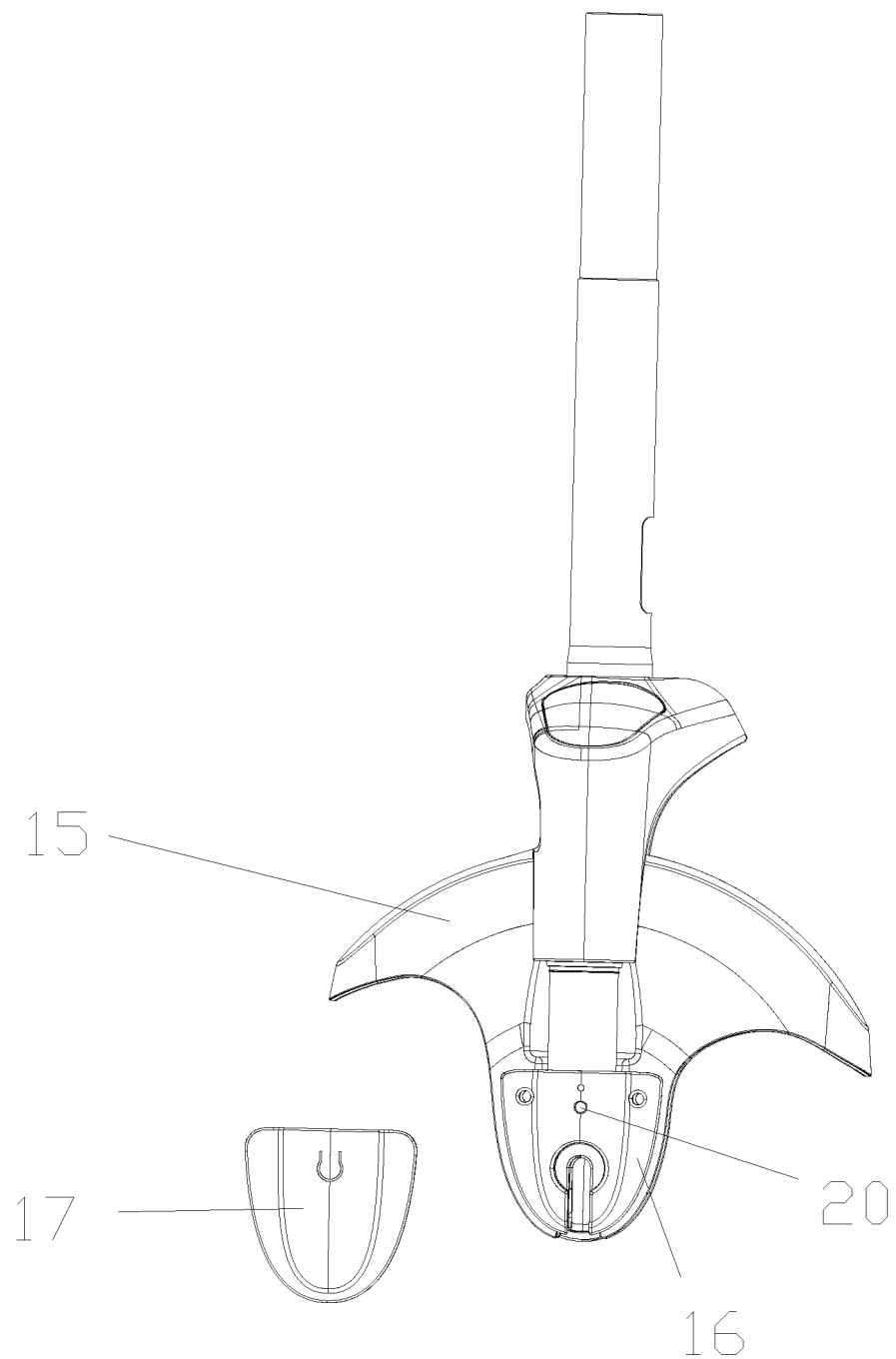
FIG. 5 is an exploded view of a front wheel bracket in FIG. 1.
Figure 6:
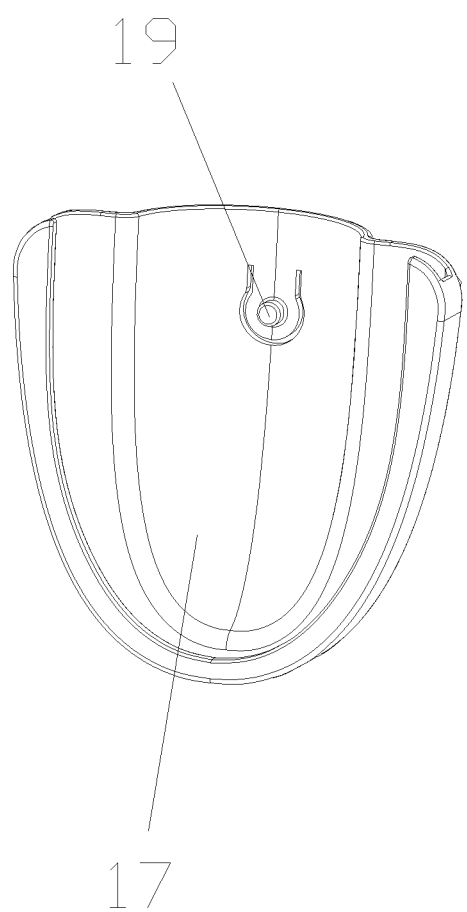
FIG. 6 is a side view of a guard in FIG. 1.

As shown in FIG. 1, FIG. 5 and FIG. 6, a front mudguard 15, a fixing frame 16 and a guard 17 are arranged at the front wheel bracket 2 of the scooter, and a rear mudguard 18 is arranged at the rear wheel bracket 5. The front mudguard 15, the rear mudguard 18 and the guard 17 are all used to shield external sundries, such as mud and water stains. The guard 17 is provided with an embedding column 19, and the fixing frame 16 has an embeddable hole 20 corresponding to the embedding column 19. The embedding column 19 is configured to be embedded in the embeddable hole 20, so that the guard 17 is detachably embedded on the fixed frame 16. When the guard 17 is too dirty, it can be easily removed and cleaned.

The scooter of the disclosure realizes the dual-use of the movable frame by hinging the movable frame to the main plate, so that the movable frame can be used not only for the support of the scooter when parking, but also for the protection of the body of the scooter during driving. The tail lamp plate integrally connected to the bottom plate can better ensure the driving safety by setting the light-emitting surface inclined. Moreover, the guard can be easily removed for cleaning.

The above describes the preferred implementation of the disclosure in detail, but the disclosure is not limited to the described embodiments. Those skilled in the art may employ various equivalent deformations or replacements without violating the gist of the disclosure, and these equivalent deformations or replacements all fall within the scope defined in the claims of the present application.

What is claimed is:

1. A scooter, comprising: a head, a front wheel bracket, a front wheel, a body, a rear wheel bracket and a rear wheel, wherein the body comprises a main plate and a bottom plate which are integrally connected, the head is connected with the front wheel bracket, the front wheel bracket is connected with the front wheel, the head is fixedly connected with the main plate, the head is fixedly connected with the bottom plate, the bottom plate is fixedly connected with the rear wheel bracket, and the rear wheel bracket is connected with the rear wheel;

wherein a movable frame is arranged at the bottom plate, and the movable frame is hinged to the bottom plate; the movable frame is provided with a push plate for driving the movable frame to rotate.

2. The scooter of claim 1, wherein the push plate is provided with a protrusion.

3. The scooter of claim 2, wherein a pedal is arranged at the bottom plate, the pedal is arranged in a same horizontal plane as the push plate in a horizontal state, and has a shape matching a shape of the push plate in the horizontal state.

4. The scooter of claim 3, wherein a tail lamp plate is arranged at an end of the bottom plate, and the tail lamp plate is integrally connected with the bottom plate.

5. The scooter of claim 4, wherein the tail lamp plate has an inclined light-emitting surface.

6. The scooter of claim 5, wherein an LED light board is arranged at the bottom plate.

7. The scooter of claim 1, wherein a fixing frame and a guard are arranged at the front wheel bracket, the guard is provided with an embedding column, the fixing frame has an embeddable hole corresponding to the embedding column, the embedding column is configured to be embedded in the embeddable hole, the guard is configured to shield external sundries.

8. The scooter of claim 7, wherein a front mudguard is further arranged at the front wheel bracket, and a rear mudguard is arranged at the rear wheel bracket.

* * * * *